United States Patent [19]

Booth et al.

[11] Patent Number: 5,330,789

[45] Date of Patent: Jul. 19, 1994

[54] CONVERSION COATING ON CARBON/CARBON COMPOSITES WITH CONTROLLED MICROSTRUCTURE

[75] Inventors: Roy E. Booth, Duncanville, Tex.; David M. Shuford, Albuquerque, N. Mex.; John S. Linck, Pueblo, Colo.

[73] Assignee: Loral Vought Systems Corporation, Grand.Prairie, Tex.

[21] Appl. No.: 14,118

[22] Filed: Feb. 5, 1993

[51] Int. Cl.$^5$ .......................... B05D 1/06; B05D 1/10
[52] U.S. Cl. .................................... 427/189; 427/190; 427/192; 427/199; 427/201; 427/203; 427/204
[58] Field of Search ............... 427/189, 190, 191, 192, 427/199, 201, 203, 204, 376.2

[56] References Cited

U.S. PATENT DOCUMENTS

| | | | |
|---|---|---|---|
| 4,465,777 | 8/1984 | Shuford | 428/408 |
| 4,500,602 | 2/1985 | Patten et al. | 427/376.2 |
| 4,585,675 | 4/1986 | Shuford | 427/376.2 |
| 4,830,919 | 5/1989 | Shuford | 428/408 |
| 5,209,950 | 5/1993 | Schwartz et al. | 427/252 |

Primary Examiner—Shrive Beck
Assistant Examiner—Brian K. Talbot
Attorney, Agent, or Firm—Richards, Medlock & Andrews

[57] ABSTRACT

The invention provides a composition of matter comprising silicon, silicon carbide and boron carbide as a coating for protecting carbon substrates from degradation at elevated temperatures. The invention also provides a method for forming a protective coating on carbon substrates by utilizing the aforesaid composition of matter.

27 Claims, 1 Drawing Sheet

1

CONVERSION COATING ON CARBON/CARBON COMPOSITES WITH CONTROLLED MICROSTRUCTURE

TECHNICAL FIELD OF THE INVENTION

This invention relates to the protection of carbon substrates from degradation at elevated temperatures. Particularly, this invention relates to a composition of matter comprised of silicon carbide, silicon, and boron carbide which are products of reactions involving the surface of carbon substrates to produce a protective coating on such substrates and protect such from degradation at elevated temperatures. Further, the invention relates to a two-step conversion coating process to form the aforesaid composition on carbon substrates as a protective coating with a uniform thickness and controlled microstructure containing dispersed Si and B$_4$C distributed throughout the coating, such that the carbon substrate is protected from degradation at elevated temperatures, especially at temperatures in the range of 900°–1600° F., and extending protection up to 3200° F. in an oxidizing environment (containing oxygen, e.g., air).

BACKGROUND OF THE INVENTION

Carbon materials, such as carbon/carbon composites, have a wide variety of uses in modern industry, especially in the areas of aerospace and aviation. However, these materials are subject to degradation, especially oxidation, at elevated temperatures. The resulting carbon monoxide and carbon dioxide do not offer any protection from oxidation for the carbon substrates. As a result, these carbon substrates are in need of a protective coating or substance which would prevent oxidation and degradation at elevated temperatures. A common coating for high temperature applications in an oxidizing environment is silicon carbide (SIC), like that disclosed in U.S. Pat. No. 4,830,919. This coating intercepts the incoming oxygen, producing silicon dioxide (SiO$_2$) through the following reaction:

$$SiC(s) + 2O_2(g) \rightarrow SiO_2(l) + CO_2(g)$$

wherein:
s = solid phase
g = gaseous phase
l = liquid phase

Above 1600° F. the liquid SiO$_2$ wets the underlying SiC coating of the carbon substrate, forming a thin, continuous film. SiO$_2$ is known in the industry to be an excellent oxygen diffusion barrier. Therefore, the success of these systems to protect carbon substrates from oxidative attack is based on an adherent SiC coating and the formation of a continuous SiO$_2$ film.

Cracks form in the SiC coating at temperatures above about 900° F. due to the thermal expansion mismatch between the protective coating and the carbon substrate, and below 1600° F. the SiO$_2$ protective layer offers little protection from oxidation due to the discontinuous nature of the film. The formation of sufficient liquid SiO$_2$ to protect the SiC coating and the carbon substrate occur only above 1600° F. At temperatures in the range of 1600°–3200° F., the cracks in the SiC coating tend to be filled with liquid SiO$_2$. Thin cross sections are required for advanced aerospace structures, such as elevons, ailerons, body flaps, etc. Thus, thin, uniform coatings of SiC with a controlled microstructure are required in order to maintain material structural integrity.

Thus, a need exists for a composition of matter and a process for forming a protective coating on carbon substrates to protect such from oxidation and degradation at temperatures lower than 1600° F., as well as at temperatures above 1600° F. A need exists also for a uniform coating with a controlled microstructure such that there is material structural integrity.

Accordingly, the present invention discloses a composition of matter and a process for forming a protective coating which has the technical advantage of protecting carbon substrates from oxidation and degradation at temperatures between 900°–1600° F. as well as at temperatures above 1600° F. up to 3200° F. The present invention discloses a two-step conversion coating process which produces a protective coating with a uniform, controlled thickness and a microstructure with Si and B$_4$C particles distributed throughout. The boron of the coating can be in the form of B$_4$C, which forms B$_2$O$_3$ when oxidized at 900° F. or above, which in turn modifies any solid SiO$_2$ formed on the coating film, to produce a liquid B$_2$O$_3$/SiO$_2$ mixture. This liquid mixture fills in the cracks in the SiC coating that occur at temperatures lower than 1600° F., thus offering a significant amount of protection from oxidation at temperatures in the range of about 900° F. to about 1600° F.

Further, a controlled, uniform thickness is desirable for the efficacy of a protective coating since the initial SiC base coating depletes at high temperatures due to the formation of gaseous SiO from solid and/or liquid SiO$_2$. The thicker the coating, the better the oxidation performance; but on the other hand, as the coating thickness is increased, the composite strength is inevitably decreased. In light of such, another technical advantage of the present invention is a thin coating of a uniform, controlled thickness, containing finely dispersed Si and B$_4$C dispersed at least generally throughout the SiC coating. Thus, the present invention offers excellent oxidative protection while not sacrificing mechanical and structural integrity of the carbon substrate.

Also, the SiC coating needs to be dense so that the formation of the protective SiO$_2$ film becomes continuous. If the SiC coating is too porous, there can be breaks in the SiO$_2$ film, resulting in oxygen ingression to the carbon substrate. However, if the coating is overly dense, the evolution of CO$_2$, which occurs during the oxidation of SiC to form SiO$_2$, could cause coating failure. Thus, there needs to be some porosity to allow the gaseous CO$_2$ to evolve. With the addition of boron, the present invention provides yet another technical advantage with an excellent balance between porosity and density by consolidating or filling in the cracks in the initial SiC coating that occur at temperatures below 600° F. while at the same time also allowing a sufficient amount of CO$_2$ to evolve.

SUMMARY OF THE INVENTION

In one aspect of the present invention, a composition is provided which offers a protective coating for carbon substrates from degradation at elevated temperatures. This composition includes a) silicon; b) silicon carbide; and c) boron carbide.

In another aspect, the present invention provides for a two-step conversion coating process in which the first step comprises contacting a surface of a carbon substrate with a first composition, comprised of a silicon particulate and a silicon carbide particulate, and thereafter heating the composition and carbon substrate to a suitable temperature, generally in the range of about 2480° F. to about 3000° F. The second step of the conversion coating process entails contacting the thus treated surface of the carbon substrate with a second composition comprised of a boron particulate, a silicon particulate and a silicon carbide particulate, and thereafter heating the resulting component to a suitable temperature, generally in the range of about 2800° F. to about 3300° F.

The two-step conversion coating process provides for a protective coating with a uniform thickness and controlled microstructure, both of which are desirable for maintaining the structural integrity of the carbon substrate, while at the same time providing oxidative protection in the temperature range of about 900° F. to about 1600° F., as well as protection in the range of about 1600° F. to about 3200° F.

DETAILED DESCRIPTION OF THE INVENTION

Figure 1:
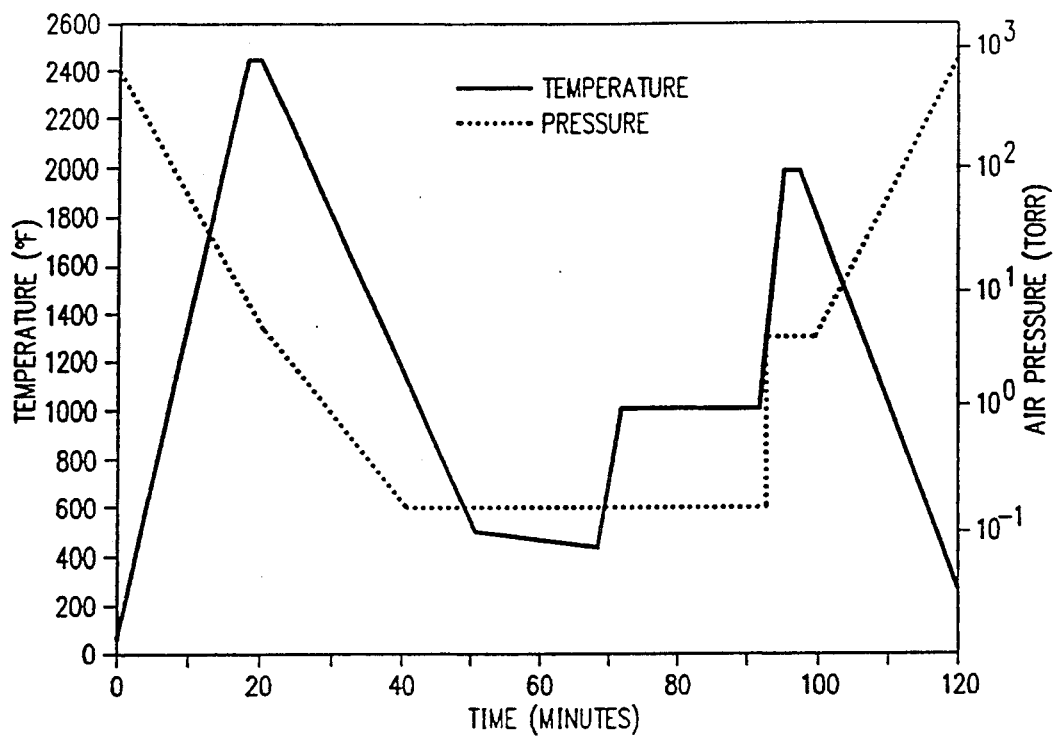
FIG. 1 is a time temperature pressure profile of a test of a coated substrate in accordance with the present invention.

The present invention provides for a coating composition of matter formed on carbon substrates to protect such substrates from degradation, especially oxidation, at elevated temperatures, specifically in the temperature range of about 900° F. to about 3200° F.

The protective coating of the present invention comprises silicon, silicon carbide and boron carbide. While these components can be employed in any suitable amounts, the coating composition of the invention will generally comprise about 1 to about 10 volume percent silicon, about 60 to about 90 volume percent silicon carbide, about 1 to about 10 volume percent boron carbide, and about 1 to about 20 volume percent porosity. Preferably this composition comprises about 3 to about 8 volume percent silicon, about 70 to about 85 volume percent silicon carbide, about 2 to about 7 volume percent boron carbide, and about 5 to about 15 volume percent porosity. The presently preferred composition comprises about 5 volume percent silicon, about 80 volume percent silicon carbide, 5 volume percent boron carbide, and about 10 volume percent porosity.

A two-step conversion coating method can be used to provide the composition of the present invention on a carbon or graphite substrate. In the first step of the conversion coating method, a first composition is formed by thoroughly mixing silicon particulates and silicon carbide particulates in any suitable ratio. Generally, this first composition comprises about 10 to about 50 weight percent of silicon particulates and about 50 to about 90 weight percent silicon carbide particulates. The presently preferred first composition comprises about 20 to about 30 weight percent silicon particulates and about 70 to about 80 weight percent silicon carbide particulates. A surface of a carbon/carbon substrate contacted with the first composition and the substrate and composition are heated to a suitable temperature, generally in the range of about 2480° F. to about 3000° F., in an inert atmosphere at a suitable pressure. In general, the carbon-carbon substrate and the first composition are heated to a temperature in the range of about 2480° F. to about 2700° F. for at least about 1 hour, then the substrate and the first composition are heated to a temperature in the range of about 2900° F. to about 3000° F. for at least about 3 hours, with each change in temperature being at a ramp rate of about 20° to about 40F°/minute. The preferred conditions at which the carbon/carbon substrate and the first composition are heated comprise heating at about 2500° F. at atmospheric pressure for at least about one hour and then heating at about 2970° F. at atmospheric pressure for at least about three hours, with each change in temperature being at a heat up or ramp rate of about 20 to about 40F°/minute. Thereafter, the substrate and the coating thereon are cooled by reducing the temperature to between about 40° F. and about 100° F.

In another embodiment of the invention, about 1 to about 10 weight percent of aluminum oxide particulates can be mixed with about 10 to about 40 weight percent silicon particulates and about 50 to about 80 weight percent of silicon carbide particulates, and heated in accordance with the above description.

The first step of the two-step conversion coating process determines the thickness of the composition on the carbon/carbon substrate. The thickness of the composition on the substrate is generally in the range of about 5 to about 20 mils, and preferably is about 12 mils.

Figure 2:
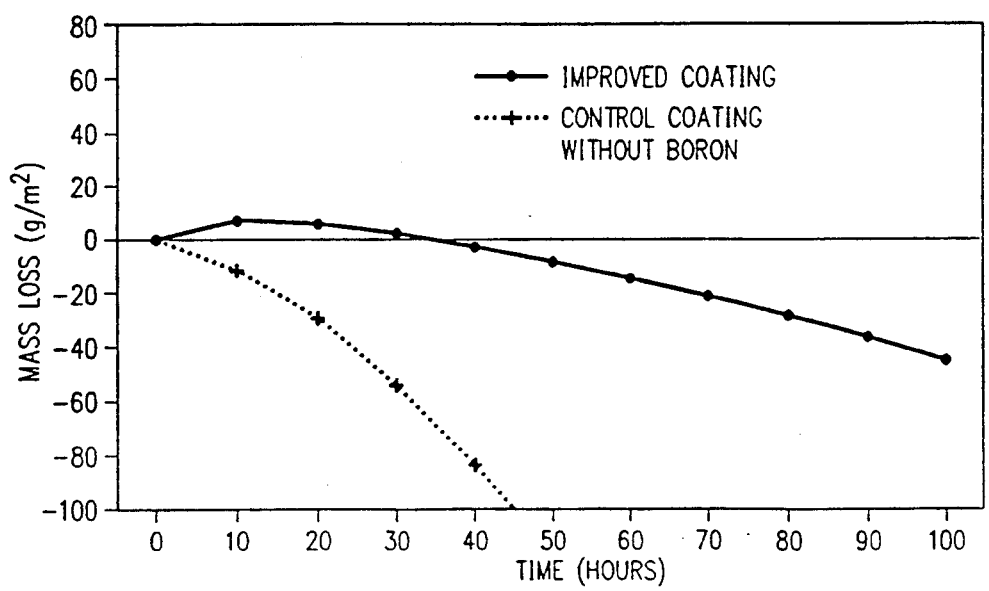
FIG. 2 is a mass loss/time comparison of a coated substrate in accordance with the present invention and a control sample without boron.

This initial primary coating is a porous coating which is composed of mainly SiC with finely dispersed Si particles. This initial primary protective coating offers little protection in the 900°-1600° F. temperature range, as shown in FIG. 2, because SiC and Si oxidize to form a wet protective film of $SiO_2$ only at temperatures above 1600° F. At temperatures lower than 1600° F., a protective film of liquid $SiO_2$ is not created to wet and coat the SiC/Si coating; therefore, this initial primary coating is deficient in the 900° F.-1600° F. temperature range.

This initial primary coating, however, sets up the surface of the carbon/carbon substrate to allow for the second step of the conversion coating process to produce a thin, uniform coating with a microstructure that is protective in the 900°-1600° F. range. The second conversion coating step transforms the porous microstructure of the initial surface treatment step into a dense microstructure. This preferred dense microstructure has a density in the range of about 2.6 to about 2.9 $g/cm^3$, and is preferably about 2.7 $g/cm^3$. The porosity of this microstructure is generally in the range of about 1 to about 20 volume percent, and is preferably about 10 volume percent.

In the second step of the two-step conversion coating method, a second composition is formed by thoroughly mixing silicon particulates, silicon carbide particulates and boron particulates in any suitable ratios. In general, this second composition comprises about 10 to about 40 weight percent of silicon particulates, about 50 to about 80 weight percent silicon carbide particulates, and about 1 to about 10 weight percent boron particulates. The presently preferred second composition comprises about 20 to about 30 weight percent silicon particulates, about 65 to about 75 weight percent silicon carbide particulates and about 4 to about 6 weight percent boron particulates. A surface of a carbon/carbon substrate, which has been coated in accordance with the first step, is contacted with the second composition and heated to a suitable temperature, generally in the range about 2800° F. to about 3300° F., in an inert atmosphere at a suitable pressure. In general, the carbon-carbon substrate and the second composition are heated to a temperature in the range of about 2800° F. to about 3000° F. for at least about 1 hour, then the substrate and the second composition are heated to a temperature in the range of about 3100° F. to about 3150° F. for at least about 2.5 hours, and then the substrate and the second composition are heated to a temperature in the range of about 3200° F. to about 3300° F. for at least about 1.5 hours, with each change in temperature being at a ramp rate of about 20° to about 40F°/minute. The preferred conditions for heating the carbon/carbon substrate and second composition comprise heating at about 2825° F. for at least about one hour, and then heating at about 3130° F. for at least about 2.5 hours and then heating at about 3250° F. for at least about 1.5 hours, with each change in temperature being at a heat up or ramp rate of about 20 to about 40F°/minute. The heating should be conducted in an inert atmosphere and preferably at atmospheric pressure.

The controlled microstructure and added oxidative protection are provided by the second step of the two-step conversion coating process. The boron reacts with carbon to produce $B_4C$, but also acts as a sintering aid, which helps to consolidate the coating. The resultant protective coating on the carbon/carbon substrate contains SiC, Si and $B_4C$.

When this protective coating is subjected to oxidative conditions within the 900°–1600° F. temperature range, some of the $B_4C$ in the protective coating oxidizes to $B_2O_3$ and $CO_2$, while some of the SiC oxidizes to $SiO_2$ and $CO_2$, utilizing the following reactions:

$$B_4C(s) + 4O_2(g) \rightarrow 2B_2O_3(l) + CO_2(g)$$

$$SiC(s) + 2O_2(g) \rightarrow SiO_2(l) + CO_2(g)$$

The $B_2O_3$ joins the $SiO_2$ on the surface of the SiC coating to produce a liquid $B_2O_3$-$SiO_2$ mixture. This liquid mixture provides protection by filling in the thermal expansion cracks in the primary coating.

This preferred microstructure has the following advantages: 1) it is dense to prevent oxygen ingress to the carbon substrate to either line-of-sight attack or solid state diffusion of oxygen through the coating; 2) it provides a source of boron through the presence of $B_4C$ which has a threshold of oxidation in the 900° F.–1000° F. temperature range. When oxidized to form $B_2O_3$, a continuous liquid film is formed in the troublesome 900° F.–1600° F. range. The liquid $B_2O_3$ wets both the SiC coating and the carbon substrate. The liquid $B_2O_3$ also catalyzes the oxidation of the SiC coating, producing a generous supply of liquid $SiO_2$ which adds to the protection; 3) it has sufficient open porosity to allow for venting of gases due to the reactions of oxygen with both solid SiC and $B_4C$ producing gaseous $CO_2$; 4) it has closed and open pores which provides for expansion when liquid reaction products have a greater volume than the solid reactants. For example, during the oxidation of solid Si to form liquid $SiO_2$, the pores can fill up without causing build up of stresses which could cause mechanical coating failure.

EXAMPLES

Example 1

An advanced carbon-carbon (ACC) composite structure was coated in accordance with the present invention. The ACC substrate was held together with phenolic resin. A total of four liquid phenolic intrusion densification steps followed by inert pyrolysis to 1600° F. converted the organic phenolic resin into inorganic carbon. This was the starting substrate.

The first-step in the conversion process consisted of mixing 10 weight percent aluminum oxide particulates, 60 weight percent silicon carbide particulates, and 30 weight percent silicon particulates. The silicon carbide utilized was obtained from the Carborumbum Company under the trade designation "RA 1200-Green Grit" the aluminum oxide was obtained from the Alumina Company of America under the trade designation "T-61" and particulate silicon utilized has a particle size of about 325 Tyler Standard Screen Scale.

The substrate was packed in a graphite retort with the particulate mixture in contact with the surface of the substrate. The substrate and mixture were dried and subsequently placed into a furnace retort. The furnace retort was evacuated and back flushed twice with an inert gas (argon). The furnace retort and its contents were heated to 2500° F. and held at that temperature for 1 hour, then heated at 2900° F. and held at that temperature for 3 hours. After cooling, the resulting coated substrate was removed from the furnace retort, and cleaned.

The thus cooled substrate was packed in a furnace retort for the second-step of the conversion process and contacted with a mixture of 63 weight percent silicon carbide particulate, 32 weight percent silicon particulate, and 5 weight percent boron particulate. The boron was obtained from Kerr-McGee with a 5 micron size. The time-temperature profile for the second step comprised heating to 2825° F. and holding at that temperature for 1 hour, then heating to 3130° F. and holding at that temperature for 2.5 hours, and finally heating to 3250° F. and holding at that temperature for 1.5 hours.

A resulting coated substrate having the two-step coating was subjected to the cycle shown in FIG. 1. The time-temperature-pressure (TTP) profile shown in FIG. 1 is a representation of the fuselage environment for the National Aerospace Plane (NASP). The cycle is divided into 3 sections: first, ascent; second, cruise, and third, descent. The pressure is depicted by the dash line and read from the right-vertical axis. The high pressure is atmospheric pressure (760 torr at sea level) down to a vacuum (about 0.7 torr). The temperatures, which are shown on the left-vertical axis and read from the solid line, go from a starting temperature in the range of 65° F. to 85° F. to a high of over 2400° F. The highest pressure and, therefore, the highest concentration of oxygen corresponds to the highest temperature exposure. Low temperatures have the lowest pressures which have the lowest oxygen levels.

The protection of a carbon/carbon substrate by a SiC and $B_4C$ coating is based on the oxidation of the coating to form liquid $SiO_2$ and $B_2O_3$. This $SiO_2$ and $B_4O_3$ serve as an excellent oxidation barrier due to the low diffusion rate of oxygen through $SiO_2$. Because of this mechanism of protection, the high temperature may be less of a problem to prevent oxidation than the low temperature section of the cycle. Therefore, the coating must protect throughout the complete cycle. A cycle lasts two hours; therefore, sample survival can be denoted by either the number of cycles and/or the number of hours.

The results are plotted in FIG. 2. In FIG. 2, a sample A with the dimensions of 1.25"×8"×0.1" and coated according to this invention was oxidation tested followed by weighing every ten hours (five cycles). The vertical axis shows weight loss as mass per unit of area (g/m$^2$). This method of presenting the data assumes surface mass loss from the surface of the coated carbon/carbon. A control sample B is also plotted as comparison The control specimen, 1.25"×4"×0.1", had a SiC coating without any boron.

Sample A processed per this invention showed a slight weight gain followed by a weight loss. On the other hand, the control specimen B started losing weight at the onset. A two percent weight loss is usually considered the point of failure and two percent is achieved at about 40 grams per square meter for these samples. The sample A prepared by this invention achieved this point in 100 hours while the control B achieved it in about 25 hours. In other terms, this invention increased the lifetime by a factor of four.

Although the present invention has been described with respect to a preferred embodiment and alternative embodiments, various changes, substitutions and modifications of these may be suggested to one skilled in the art, and it is intended that the present invention encompass such changes, substitutions and modifications as fall within the scope of the appended claims.

We claim:

1. A method for forming a coating on a carbon substrate for protecting the substrate from degradation at elevated temperatures, comprising:
    (a) forming a first mixture consisting essentially of silicon particulates and silicon carbide particulates;
    (b) contacting a surface of said substrate with said first mixture;
    (c) heating said surface of said substrate and the thus contacting first mixture under suitable reaction conditions to form a first coating on said surface of said substrate;
    (d) cooling the thus coated substrate surface;
    (e) forming a second mixture comprising boron particulates, silicon carbide particulates, and silicon particulates;
    (f) contacting said thus coated substrate surface with said second mixture; and
    (g) heating said thus coated substrate surface and the thus contacting second mixture under suitable reaction conditions to form a microstructure coating on said surface of said substrate.

2. A method as in claim 1, wherein
    the content of said silicon particulates in said first mixture is in the range of about 10 to about 50 weight percent; and
    the content of said silicon carbide particulates in said first mixture is in the range of about 50 to about 90 weight percent.

3. A method as in claim 1, wherein:
    the content of said silicon particulates in said first mixture is in the range of about 20 to about 30 weight percent; and
    the content of said silicon carbide particulates in said first mixture is in the range of about 70 to about 80 weight percent.

4. A method as in claim 1, wherein:
    the content of said silicon particulates in said second mixture is in the range of about 10 to about 40 weight percent;
    the content of said silicon carbide particulates in said second mixture is in the range of about 50 to about 80 weight percent; and
    the content of said boron particulates in said second mixture is in the range of about 1 to about 10 weight percent.

5. A method as in claim 3, wherein:
    the content of said silicon particulates in said second mixture is in the range of about 20 to about 30 weight percent;
    the content of said silicon carbide particulates in said second mixture is in the range of about 65 to about 75 weight percent; and
    the content of said boron particulates in said second mixture is in the range of about 4 to about 6 weight percent.

6. A method as in claim 1, wherein said first mixture and said substrate are heated to a temperature in the range of about 2480° F. to about 2700° F. for at least about 1 hour, then said first mixture and said substrate are heated to a temperature in the range of about 2900° F. to about 3000° F. for at least about 3 hours, with each change in temperature being at a ramp rate in the range of about 20° to about 40F°/minute.

7. A method as in claim 6, wherein said second mixture and said substrate are heated to a temperature in the range of about 2800° F. to about 3000° F. for at least 1 hours, then said second mixture and said substrate are heated to a temperature in the range of about 3100° F. to about 3150° F. for at least about 2.5 hours, and then said second mixture and said substrate are heated to a temperature in the range of about 3200° F. to about 3300° F. for at least about 1.5 hours, with each change in temperature being at a ramp rate in the range of about 20° to about 40F°/minute.

8. A method as in claim 7, wherein said first mixture contacts said substrate by encasing said substrate in said first mixture.

9. A method as in claim 8, wherein said second mixture contacts said substrate by encasing said substrate in said second mixture.

10. A method as in claim 1, wherein said microstructure coating on said substrate has a density in the range of about 2.6 to about 2.9 g/cm$^2$.

11. A method as in claim 1, wherein said microstructure coating on said substrate has a porosity in the range of about 1 to about 20 volume percent.

12. A method as in claim 1, wherein said first coating has a thickness in the range of about 5 to about 20 mils.

13. A method for forming a coating on a carbon substrate for protecting the substrate from degradation at elevated temperatures, comprising:
    (a) forming a first mixture consisting essentially of silicon particulates, silicon carbide particulates, and aluminum oxide particulates;
    (b) contacting a surface of said substrate with said first mixture;
    (c) heating said surface of said substrate and the thus contacting first mixture under suitable reaction conditions to form a first coating on said surface of said substrate;
    (d) cooling the thus coated substrate surface;
    (e) forming a second mixture comprising boron particulates, silicon carbide particulates, and silicon particulates;

(f) contacting said thus coated substrate surface with said second mixture; and (g) heating said thus coated substrate surface and the thus contacting second mixture under suitable reaction conditions to form a microstructure coating on said surface of said substrate.

14. A method as in claim 13, wherein:
the content of said silicon particulates in said first mixture is in the range of about 10 to about 40 weight percent; the content of said silicon carbide particulates in said first mixture is in the range of about 50 to about 80 weight percent; and
the content of said aluminum oxide particulates in said first mixture is in the range of about 1 to about 10 weight percent.

15. A method as in claim 14, wherein:
the content of said silicon particulates in said second mixture is in the range of about 10 to about 40 weight percent; the content of said silicon carbide particulates in said second mixture is in the range of about 50 to about 80 weight percent; and
the content of said boron particulates in said second mixture is in the range of about 1 to about 10 weight percent.

16. A method as in claim 14, wherein:
the content of said silicon particulates in said second mixture is in the range of about 20 to about 30 weight percent;
the content of said silicon carbide particulates in said second mixture is in the range of about 65 to about 75 weight percent; and
the content of said boron particulates in said second mixture is in the range of about 4 to about 6 weight percent.

17. A method as in claim 16, wherein said first mixture and said substrate are heated to a temperature in the range of about 2480° F. to about 2700° F. for at least about 1 hour, then said first mixture and said substrate are heated to a temperature in the range of about 2900° F. to about 3000° F. for at least about 3 hours, with each change in temperature being at a ramp rate in the range of about 20° to about 40F°/minute.

18. A method as in claim 17, wherein said second mixture and said substrate are heated to a temperature in the range of about 2800° F. to about 3000° F. for at least about 1 hour, then said second mixture and said substrate are heated to a temperature in the range of about 3100° F. to about 3150° F. for at least about 2.5 hours, and then said second mixture and said substrate are heated to a temperature in the range of about 3200° F. to about 3300° F. for at least about 1.5 hours, with each change in temperature being at a ramp rate in the range of about 20° to about 40F°/minute.

19. A method as in claim 13, wherein:
the content of said silicon particulates in said second mixture is in the range of about 10 to about 40 weight percent;
the content of said silicon carbide particulates in said second mixture is in the range of about 50 to about 80 weight percent; and
the content of said boron particulates in said second mixture is in the range of about 1 to about 10 weight percent.

20. A method as in claim 13, wherein:
the content of said silicon particulates in said second mixture is in the range of about 20 to about 30 weight percent;
the content of said silicon carbide particulates in said second mixture is in the range of about 65 to about 75 weight percent; and
the content of said boron particulates in said second mixture is in the range of about 4 to about 6 weight percent.

21. A method as in claim 13, wherein said first mixture and said substrate are heated to a temperature in the range of about 2480° F. to about 2700° F. for at least about 1 hour, then said first mixture and said substrate are heated to a temperature in the range of about 2900° F. to about 3000° F. for at least about 3 hours, with each change in temperature being at a ramp rate in the range of about 20 to about 40F°/minute.

22. A method as in claim 13, wherein said second mixture and said substrate are heated to a temperature in the range of about 2800° F. to about 3000° F. for at least about 1 hour, then said second mixture and said substrate are heated to a temperature in the range of about 3100° F. to about 3150° F. for at least about 2.5 hours, and then said second mixture and said substrate are heated to a temperature in the range of about 3200° F. to about 3300° F. for at least about 1.5 hours, with each change in temperature being at a ramp rate in the range of about 20 to about 40F°/minute.

23. A method as in claim 13, wherein said first mixture contacts said substrate by encasing said substrate in said first mixture.

24. A method as in claim 13, wherein said second mixture contacts said substrate by encasing said substrate in said second mixture.

25. A method as in claim 13, wherein said microstructure coating on said substrate has a density in the range of about 2.6 to about 2.9 g/cm$^2$.

26. A method as in claim 13, wherein said microstructure coating on said substrate has a porosity in the range of about 1 to about 20 volume percent.

27. A method as in claim 13, wherein said first coating has a thickness in the range of about 5 to about 20 mils.

* * * * *

UNITED STATES PATENT AND TRADEMARK OFFICE
CERTIFICATE OF CORRECTION

PATENT NO. : 5,330,789

DATED : July 19, 1994

INVENTOR(S) : Roy E. Booth et al

It is certified that error appears in the above-indentified patent and that said Letters Patent is hereby corrected as shown below:

Column 8, lines 30-31, delete "1 hours," and insert --about 1 hour,--.

Signed and Sealed this

Eleventh Day of October, 1994

Attest:

BRUCE LEHMAN

Attesting Officer

Commissioner of Patents and Trademarks